United States Patent
Zheng et al.

(10) Patent No.: US 8,755,178 B2
(45) Date of Patent: Jun. 17, 2014

(54) FRAME ASSEMBLY FOR DETACHABLY FIXING AN ELECTRICAL COMPONENT AND ELECTRONIC DEVICE EMPLOYING SAME

(75) Inventors: Lei Zheng, Shenzhen (CN); Zhen-Xing Ye, Shenzhen (CN)

(73) Assignees: Hong Fu Jin Precision Industry (ShenZhen) Co., Ltd., Shenzhen (CN); Hon Hai Precison Industry Co., Ltd., New Taipei (TW)

( * ) Notice: Subject to any disclaimer, the term of this patent is extended or adjusted under 35 U.S.C. 154(b) by 70 days.

(21) Appl. No.: 13/556,221

(22) Filed: Jul. 24, 2012

(65) Prior Publication Data

US 2013/0083462 A1   Apr. 4, 2013

(30) Foreign Application Priority Data

Sep. 30, 2011   (CN) .......................... 2011 1 0297197

(51) Int. Cl.
*G06F 1/16*   (2006.01)
*G11B 33/12*   (2006.01)

(52) U.S. Cl.
CPC .................................. *G11B 33/124* (2013.01)
USPC ............ 361/679.37; 361/679.33; 361/679.34; 361/679.35; 292/80

(58) Field of Classification Search
CPC ......... G06F 1/181; G06F 1/183; G06F 1/184; G06F 1/187; G06F 1/188; G06F 1/1616; G06F 1/1656; G06F 1/1679
USPC ........................ 361/679.33–679.39, 724–727; 312/223.1, 223.2, 332.1, 333; 248/220.21, 222.11, 222.12; 292/1.5, 292/14, 17, 19, 24, 35

See application file for complete search history.

(56) References Cited

U.S. PATENT DOCUMENTS

| | | | |
|---|---|---|---|
| 5,634,675 A * | 6/1997 | Mo ................................. | 292/80 |
| 6,600,648 B2 * | 7/2003 | Curlee et al. ............. | 361/679.34 |
| 6,798,651 B2 * | 9/2004 | Syring et al. ............. | 361/679.34 |
| 7,359,189 B2 * | 4/2008 | Chiang et al. ............. | 361/679.33 |
| 7,562,915 B2 * | 7/2009 | Chen .............................. | 292/209 |
| 7,581,303 B2 * | 9/2009 | Soule et al. ..................... | 29/592 |
| 7,697,278 B2 * | 4/2010 | Peng et al. ............... | 361/679.35 |
| 7,701,706 B2 * | 4/2010 | Peng et al. ............... | 361/679.37 |
| 8,310,827 B2 * | 11/2012 | Huang et al. ............. | 361/679.37 |
| 8,549,912 B2 * | 10/2013 | Merrow et al. ................. | 73/431 |

* cited by examiner

*Primary Examiner* — Lisa Lea Edmonds
*Assistant Examiner* — Christopher L Augustin
(74) *Attorney, Agent, or Firm* — Novak Druce Connolly Bove + Quigg LLP

(57) ABSTRACT

An exemplary frame assembly includes a mounting frame and a fixing frame which is detachably mounted inside the mounting frame. The fixing frame includes two opposite side plate and two latching assemblies. Each latching assembly includes two connecting arms, a main body and a handle. Each connecting arm includes a first section extends from a front end of a corresponding one of the first and second side plate a predetermined distance and coplanar with the corresponding one of the first and second side plate and a second section bent backwards from the first section and overlapping the first section. Each second section includes a first latching portion. The mounting frame includes two second latching portions. The two first latching portions of the two latching assemblies cooperate with the two second latching portions to lock the fixing frame to the mounting frame.

19 Claims, 4 Drawing Sheets

FRAME ASSEMBLY FOR DETACHABLY FIXING AN ELECTRICAL COMPONENT AND ELECTRONIC DEVICE EMPLOYING SAME

BACKGROUND

1. Technical Field

The present disclosure generally relates to a frame assembly with a latching assembly for detachably fixing an electrical component inside an electronic device.

2. Description of Related Art

Mass storage devices have been widely used for electronically storing information. A mass storage device may include a cage and a number of hard disk drives (HDDs) accommodated in the cage. In assembly of the mass storage device, first, each of the HDDs is fastened to a respective carrier with screws. The subassembly of the HDD and the carrier is then slid into the cage along guide rails formed in the cage, and fixed to the cage by a fastening member latched into the cage. However, the interior of the mass storage device is typically overcrowded with components. When a user wants to remove an HDD from the cage, it is not very convenient for the user to directly exert outer force on the fastening member at the latched area between the HDD cage and the carrier in order to loosen the fastening member. That is, taking the HDD out from the HDD cage can be problematic.

What is needed, therefore, is a means which can overcome the described limitations.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Reference will be made to the drawings to describe various embodiments in detail.

Figure 1:
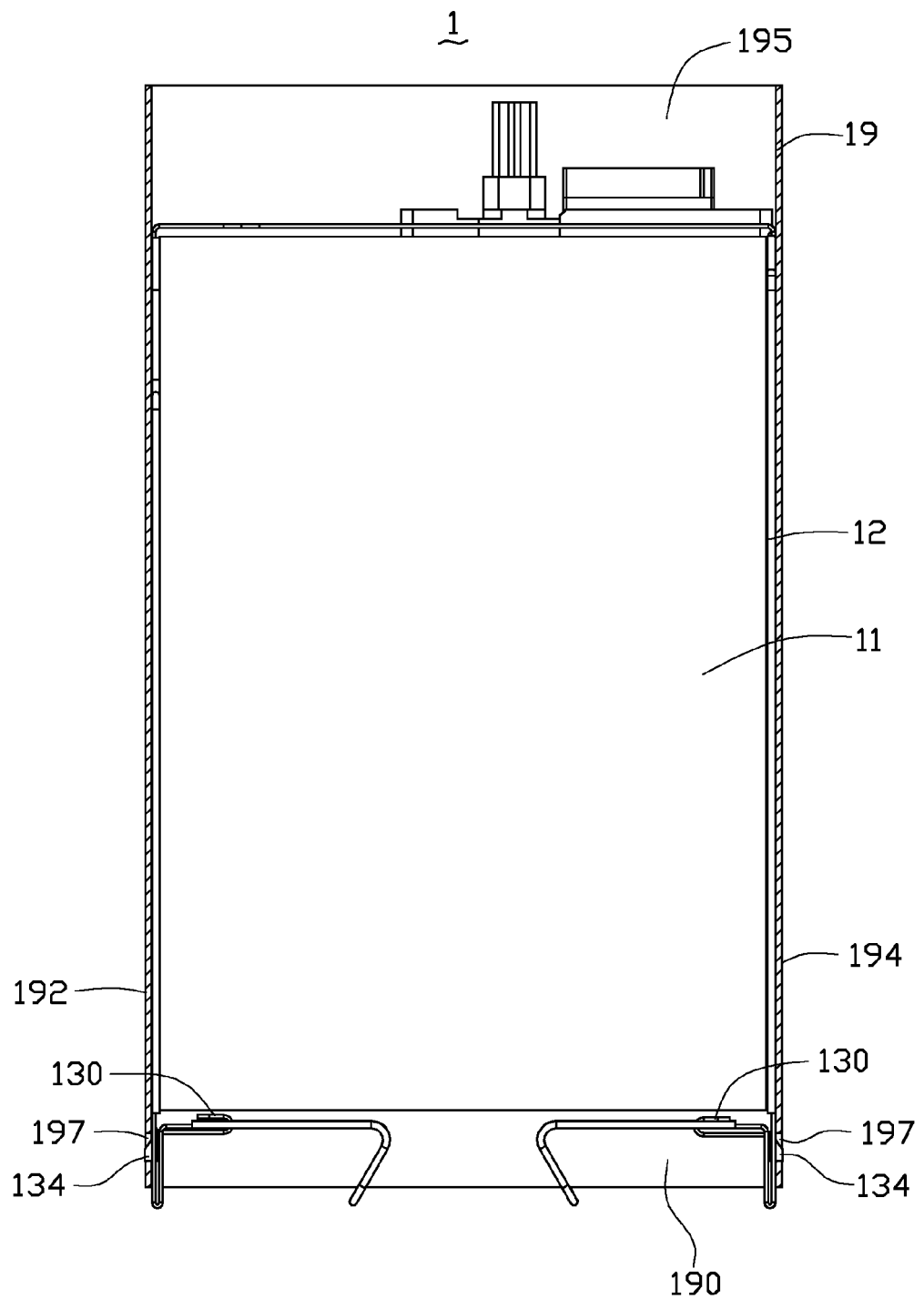
FIG. 1 is a top plan, cutaway view of an electronic device according to an exemplary embodiment of the present disclosure, the electronic device including a mounting frame, a fixing frame, and an electrical component.

FIG. 1 illustrates an electronic device 1 in accordance with an exemplary embodiment. The electronic device 1 may include an electrical component 11, a fixing frame 12 and a mounting frame 19. The mounting frame 19 may be a shell of the electronic device 1, or a separate member accommodated in a shell of the electronic device 1. The mounting frame 19 is configured to support the electrical component 11. The fixing frame 12 is configured to fix the electrical component 11 to the mounting frame 19. The electronic device 1 may be a mass storage device, the electrical component 11 may be an HDD, the fixing frame 12 may be a carrier, and the mounting frame 19 may be an HDD cage. In such case, the carrier is used to fix the HDD to the HDD cage.

Figure 2:
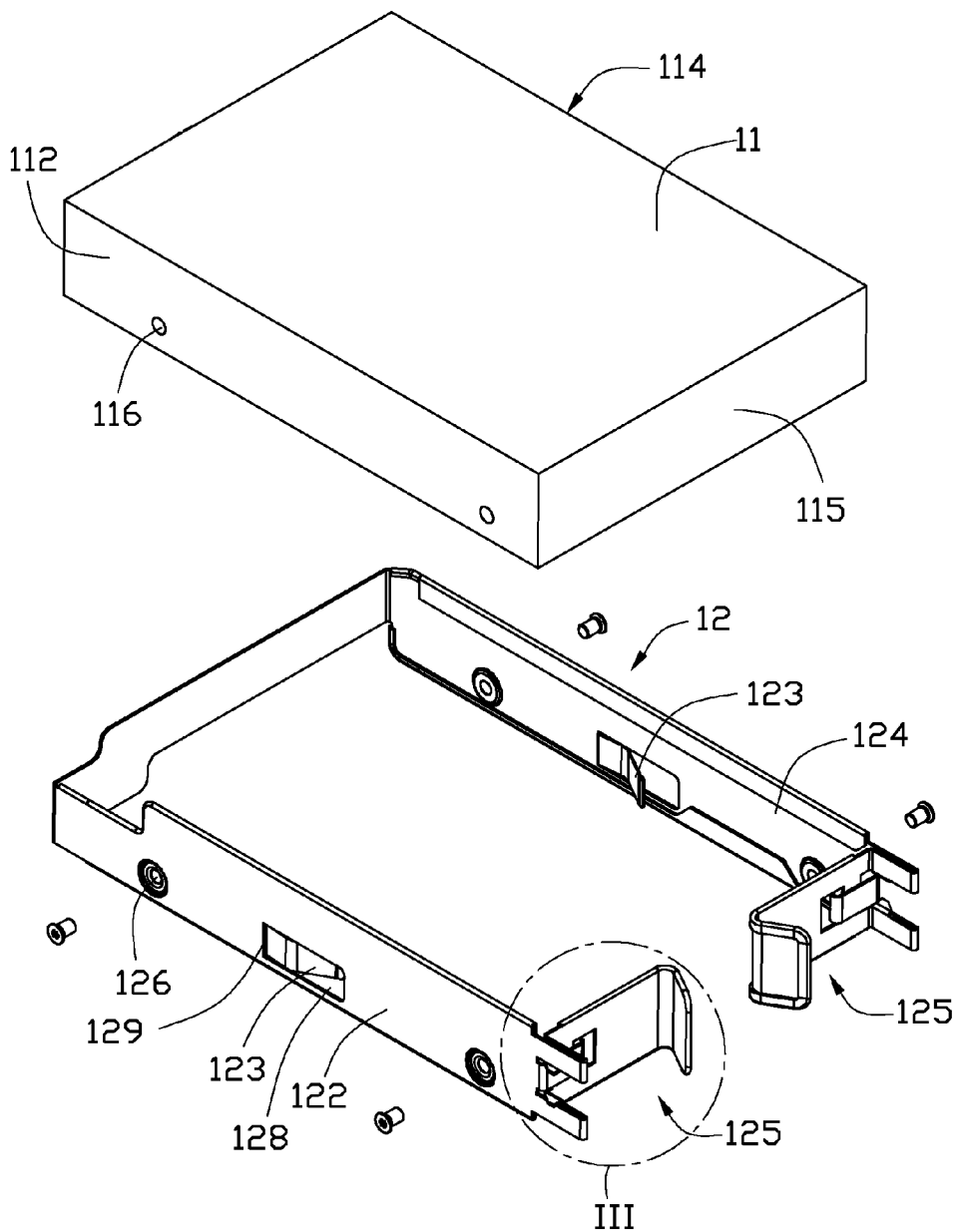
FIG. 2 is an exploded, isometric view of the fixing frame and the electrical component of the electronic device of FIG. 1.

FIG. 2 shows the electrical component 11 according to one embodiment. The electrical component 11 includes a first side panel 112 and a second side panel 114 at opposite lateral sides thereof, and a third side panel 115 interconnecting the first and second side panels 112, 114. Each of the first and second side panels 112, 114 defines two fixing holes 116. In the illustrated embodiment, the electrical component 11 is cuboid (i.e. a rectangular parallelepiped), and the third side panel 115 perpendicularly interconnects the first and second side panels 112, 114.

The fixing frame 12 includes a first side plate 122, a second side plate 124, and two latching assemblies 125. The first side plate 122 is opposite to the second side plate 124, and the two latching assemblies 125 connect with front ends of the first and second side plates 122, 124. The two latching assemblies 125 are spaced apart from each other by a gap. The first side plate 122, the second side plate 124, and the latching assemblies 125 cooperate to define a receiving space in which the electrical component 11 is located. The first and second side plates 122, 124 correspond to the first and second side panels 112, 114 of the electrical component 11, respectively. The two latching assemblies 125 correspond to and face the third side panel 115 of the electrical component 11.

Each one of the first and second side plates 122, 124 defines two screw holes 126, and a connecting hole 128 between the two screw holes 126. Four screws (not labeled) engage in the four fixing holes 116 of the first and second side panels 112, 114 of the electrical component 11 via the screw holes 126, so that the electrical component 11 is fixed to the fixing frame 12. Two elastic members 123 extend from two side edges 129 of the first and second side plates 122, 124 that bound rear ends of the connecting holes 128, respectively. The elastic members 123 bend inwards into the receiving space, such that the elastic members 123 elastically resist the electrical component 11 and help clasp the electrical component 11 in the fixing frame 12.

Figure 3:
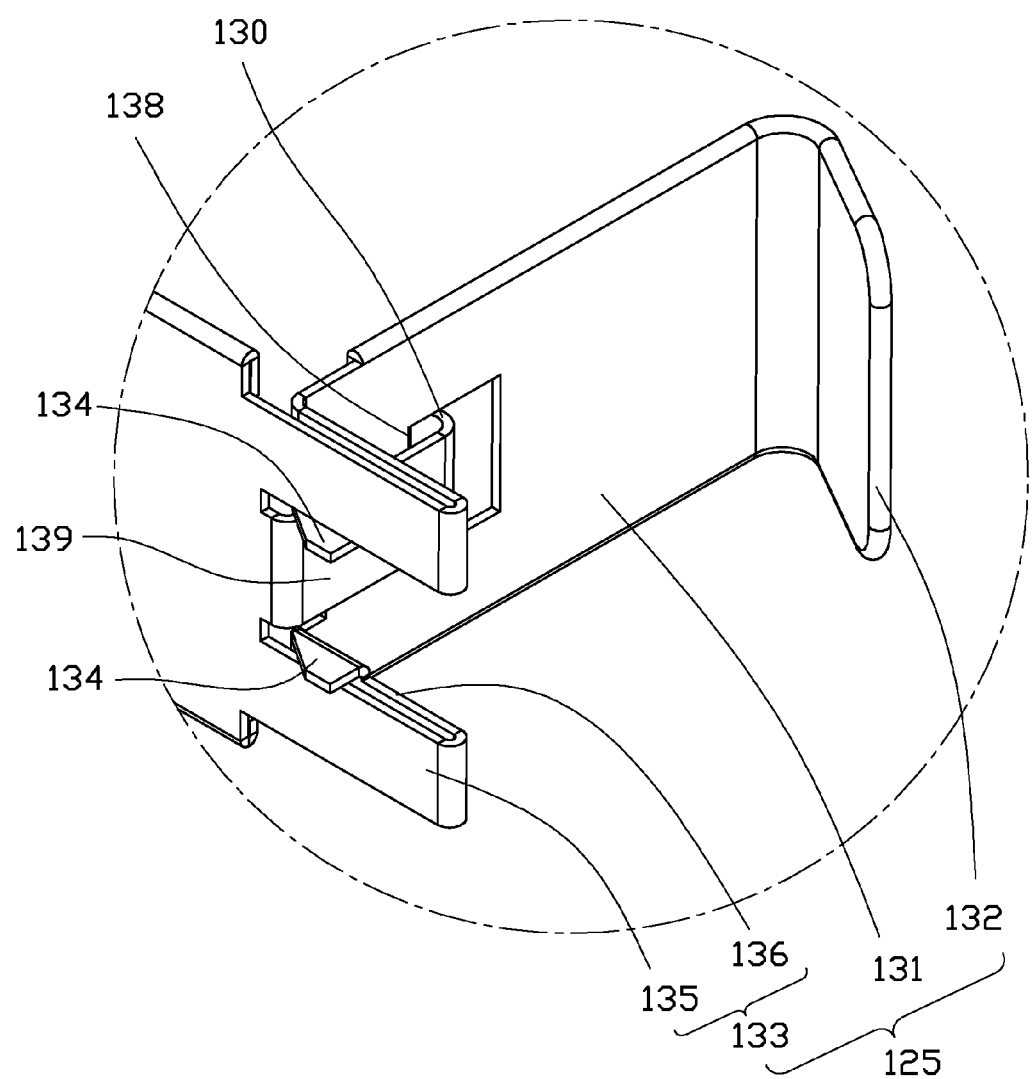
FIG. 3 is an enlarged view of a circled part III of the fixing frame of FIG. 2.

Referring also to FIG. 3, each latching assembly 125 includes a main body 131, a handle 132, at least one connecting arm 133, and at least one first latching portion 134. The main body 131 faces the third side panel 115 of the electrical component 11 when the electrical component 11 is fixed in the fixing frame 12. The at least one connecting arm 133 interconnects a corresponding one of the first and second side plates 122, 124 and the main body 131. The at least one connecting arm 133 includes a first section 135 and a second section 136. The first section 135 extends a predetermined distance from an end of the corresponding one of the first and second side plates 122, 124 and is coplanar with the corresponding one of the first and second side plates 122, 124. The second section 136 bends backwards from the first section 135 and overlaps the first section 135. The first section 135 connects to the corresponding one of the first and second side plates 122, 124, and the second section 136 connects to the main body 131. The at least one first latching portion 134 is located at an edge of a rear end of the second section 136 of the at least one connecting arm 133. In particular, the at least one first latching portion 134 is bent perpendicularly outwardly from either a bottom edge or a top edge of the rear end of the second section 136. The main body 131 interconnects the second section 136 and the handle 132. The handles 132 of the two latching assemblies 125 are spaced apart from each other by the gap.

In the illustrated embodiment, each latching assembly 125 includes two connecting arms 133 extending from the corresponding one of the first and second side plates 122, 124, and two first latching portions 134 extending from bottom and top edges of the rear ends of the second sections 136 of the two connecting arms 133, respectively. The connecting arms 133 are spaced apart from each other a distance "D." In the illustrated embodiment, the first latching portions 134 may be protrusions, which are perpendicular to the first and second side plates 122, 124, and which point towards a corresponding one of opposite lateral sidewalls 194 of the mounting frame 19 when the fixing frame 12 is received in the mounting frame 19.

Figure 4:
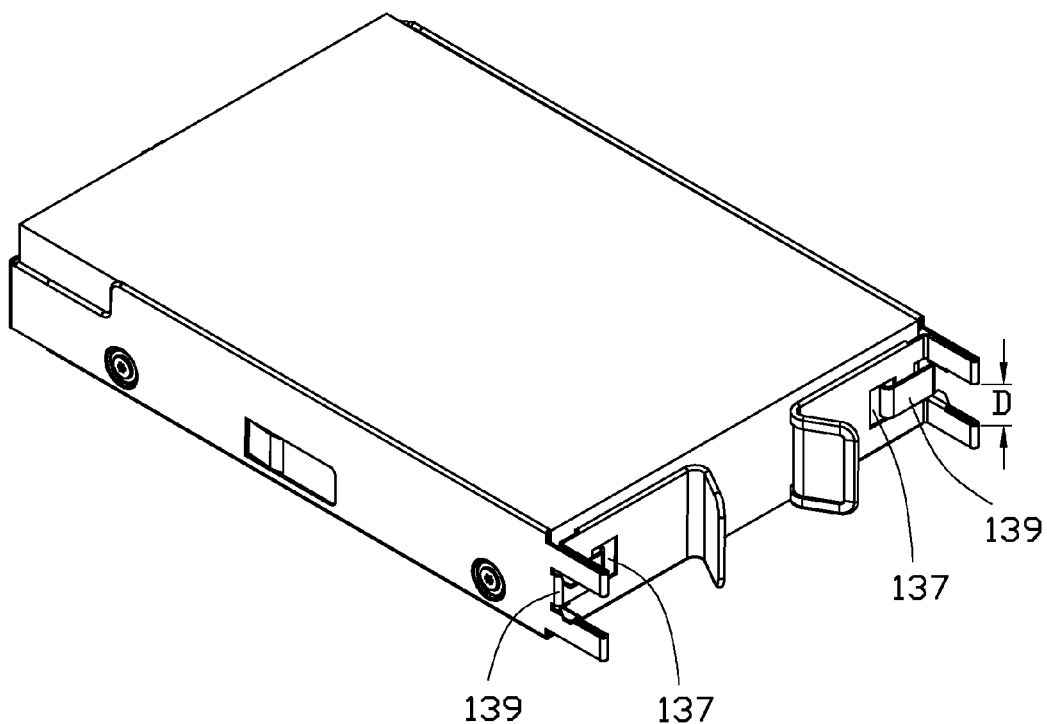
FIG. 4 is an assembled view of the fixing frame and the electrical component of FIG. 2.

Referring also to FIG. 4, each latching assembly 125 further includes a limiting arm 139 between the two connecting arms 133, and a limiting slot 137 defined in the main body 131. The limiting arm 139 connects to the end of the corresponding one of the first and second side plates 122, 124. In particular, the limiting arm 139 extends from the corresponding first or second side plate 122, 124 in a direction parallel to the main body 131, then bends backwards through the limiting slot 137, and then bends outwards towards the corresponding first or second side plate 122, 124. Thereby, a hook 130 is defined at a free end of the limiting arm 139, with the hook 130 being restricted in the limiting slot 137 but spaced from all four edges of the main body 131 that bound the limiting slot 137. In particular, the hook 130 is adjacent to a side edge 138 of the main body 131 which bounds the limiting slot 137 and which is nearest to the connecting arm 133, and there is a space between the hook 130 and the side edge 138.

The mounting frame 19 includes a bottom plate 190, and two opposite sidewalls 192, 194 perpendicularly extending from the bottom plate 190. The bottom plate 190 and the two opposite sidewalls 192, 194 cooperatively define an accommodating space 195 to receive the fixing frame 12 and the electrical component 11. Each one of the two opposite sidewalls 192, 194 includes at least one second latching portion 197. In the illustrated embodiment, each of the sidewalls 192, 194 includes a single second latching portion 197. The second latching portions 197 of the two opposite sidewalls 192, 194 correspond to the first latching portions 134 of the first and second side plates 122, 124. In the illustrated embodiment, the second latching portions 197 are substantially in the form of latching grooves defined in the two opposite sidewalls 192, 194. The second latching portions 197 correspond in shape and size to the first latching portions 134. That is, the first latching portions 134 can be firmly locked in the second latching portions 197.

In assembly of the electronic device 1, the electrical component 11 is fixed to the fixing frame 12 with the screws. The combined fixing frame 12 and electrical component 11 is inserted into the accommodating space 195 of the mounting frame 19. Typically, the combined fixing frame 12 and electrical component 11 is slid into the accommodating space 195 along a front-to-rear direction. Eventually, the first latching portions 134 reach front ends of the two opposite sidewalls 192, 194 of the mounting frame 19, elastically deform inwardly and ride along inner surfaces of the sidewalls 192, 194, and then snappingly engage in the second latching portions 197. In this position, the first and second side plates 122, 124 abut against the two opposite sidewalls 192, 194 of the mounting frame 19, and the first latching portions 134 are locked in the second latching portions 197. The fixing frame 12 with the electrical component 11 is thus secured to the mounting frame 19.

The combined fixing frame 12 and electrical component 11 can be removed from the mounting frame 19 by disengaging the first latching portions 134 from the second latching portions 197 as follows. The two handles 132 of the two latching assemblies 125 are drawn toward each other to reduce the distance between the handles 132. In this process, the main body 131 and the second section 136 of each latching assembly 125 move in unison with the corresponding handle 132. When the main body 131 moves away from the corresponding one of the first and second side plates 122, 124, the side 138 of the limiting slot 137 moves towards the hook 130 of the limiting arm 139 until the side edge 138 abuts against the hook 130. The limiting arm 139 can thus limit excessive movement of the main body 131 away from the corresponding first or second side plate 122, 124. The second sections 136 move in unison with the main body 131 away from the corresponding first or second side plate 122, 124, such that the second sections 136 incline relative to the corresponding first or second side plate 122, 124. That is, the second section 136 and the first section 135 of each connecting arm 133 form an acute angle therebetween. The first latching portions 134 move in unison with the second sections 136 away from the corresponding first or second side plate 122, 124, and the first latching portions 134 thereby disengage from the corresponding second latching portion 197. The combined fixing frame 12 and electrical component 11 can then be drawn out from the mounting frame 19. The combined fixing frame 12 and electrical component 11 are thus conveniently removed from the mounting frame 19.

With the above-described configuration, the combined fixing frame 12 and electrical component 11 can be quickly and securely engaged in the mounting frame 19. In addition, because the first latching portions 134 of the fixing frame 12 move in unison with the second sections 136 of the corresponding connecting arms 133 when the handles 132 are pulled toward each other, the first latching portions 134 can be quickly and safely disengaged from the mounting frame 19, and the combined fixing frame 12 and electrical component 11 can be quickly and safely removed from the mounting frame 19 when needed. Furthermore, due to the limiting arms 139 limiting the movements of the latching assemblies 125, the connecting arms 133 are prevented from being pulled too far away from the corresponding first and second side plates 122, 124 when the handles 132 are drawn toward each other. Thus the risk of the latching assemblies 125 being damaged is relatively low.

The electronic device 1 is not limited to the above-described embodiments. For example, in alternative embodiments, the fixing frame 12 includes only one side plate 122 or 124, with only one latching assembly 125 connected to that side plate 122 or 124. In such case, the combined fixing frame 12 and electrical component 11 is fixed to the mounting frame 19 via the single latching assembly 125.

It is believed that the present embodiments and their advantages will be understood from the foregoing description, and it will be apparent that various changes may be made thereto without departing from the spirit and scope of the embodiments or sacrificing all of their material advantages.

What is claimed is:

1. A frame assembly, comprising:
a mounting frame comprising at least one second latching portion;
a fixing frame detachably mounted substantially inside the mounting frame, the fixing frame configured for receiving an electrical component therein and comprising:
at least one side plate which the electrical component is attached to; and
at least one latching assembly connecting with the at least one side plate and comprising at least one connecting arm, a main body, and a handle, the at least one connecting arm comprising:
a first section extending from a front end of the at least one side plate a predetermined distance and being coplanar with the at least one side plate; and a second section bent backwards from the first section and overlapping the first section, the main body interconnecting the second section of the at least one connecting arm and the handle, the second section of the at least one connecting arm comprising a first latching portion;

wherein the first latching portion of at least one connecting arm cooperates with the at least one second latching portion to lock the fixing frame to the mounting frame; and wherein when external force is exerted on the handle to move the handle away from the at least one side plate, the main body moves in unison with the handle and pulls the second section of the at least one connecting arm away from the at least one side plate, with the second section inclining relative to the at least one side plate, and the first latching portion moves in unison with the second section of the at least one connecting arm and disengages from the at least one second latching portion of the mounting frame.

2. The frame assembly of claim 1, wherein the at least one side plate defines at least one screw hole, and the electrical component is fixed to the at least one side plate by at least one screw.

3. The frame assembly of claim 1, wherein the at least one side plate comprises two side plates, the at least one latching assembly comprises two latching assemblies, the two side plates are a first side plate and a second side plate opposite to the first side plate, the two latching assemblies connect with front ends of the first and second side plates, the two latching assemblies are spaced apart from each other by a gap, and the first side plate, the second side plate and the two latching assemblies cooperate to define a receiving space for receiving the electrical component.

4. The frame assembly of claim 3, wherein each of the first and second side plates defines a connecting hole, and a pair of elastic members extends from rear sides of the first and second side plates that bound rear ends of the connecting holes and bend inwards into the receiving space such that distal ends of the elastic members are positioned to elastically resist the electrical component and help clasp the electrical component in the fixing frame.

5. The frame assembly of claim 1, wherein the at least one first latching portion is a protrusion, and the at least one second latching portion comprises a latching groove.

6. The frame assembly of claim 3, wherein the main body of each latching assembly defines a limiting slot, and each latching assembly further comprises a limiting arm which connects to the front end of a corresponding one of the first and second side plates, the limiting arm extends from the front end of the corresponding one of the first and second side plates in a direction parallel to the main body, then bends backwards through the limiting slot, and then bends outwards towards the corresponding one of the first and second side plates such that a hook is defined at a free end of the limiting arm, the hook is restricted in the limiting slot, the hook is adjacent to a side edge of the main body which bounds the limiting slot and which is nearest to the connecting arm, and there is a space between the side edge and the hook.

7. The frame assembly of claim 6, wherein the at least one connecting arm of each latching assembly is two connecting arms, the two connecting arms are spaced apart from each other, and the limiting arm of the latching assembly is between the two connecting arms.

8. The frame assembly of claim 3, wherein the mounting frame further comprises a bottom plate and two opposite sidewalls perpendicular extending from the bottom plate, the bottom plate and the two opposite sidewalls cooperatively define an accommodating space receiving the fixing frame, the at least one second latching portion comprises two latching portions, each of the two opposite sidewalls comprises one of the second latching portions, and the first latching portions of the latching assemblies cooperate with the second latching portions of the sidewalls to lock the fixing frame to the mounting frame.

9. An electronic device, comprising:

an electrical component;

a mounting frame comprising at least one second latching portion; and a fixing frame detachably mounted substantially inside the mounting frame, the fixing frame receiving the electrical component therein and comprising:

at least one side plate which the electrical component is attached to; and at least one latching assembly connecting with the at least one side plate and comprising at least one connecting arm, a main body, and a handle, the at least one connecting arm comprising:

a first section extending from a front end of the at least one side plate a predetermined distance and being coplanar with the at least one side plate; and a second section bent backwards from the first section and overlapping the first section, the main body interconnecting the second section of the at least one connecting arm and the handle, the second section of the at least one connecting arm comprising a first latching portion;

wherein the first latching portion of at least one connecting arm cooperates with the at least one second latching portion to lock the fixing frame to the mounting frame; and wherein when external force is exerted on the handle to move the handle away from the at least one side plate, the main body moves in unison with the handle and pulls the second section of the at least one connecting arm away from the at least one side plate, with the second section inclining relative to the at least one side plate, and the first latching portion moves in unison with the second section of the at least one connecting arm and disengages from the at least one second latching portion of the mounting frame.

10. The electronic device of claim 9, wherein the at least one side plate comprises two side plates, the at least one latching assembly comprises two latching assemblies, the two side plates are a first side plate and a second side plate opposite to the first side plate, the two latching assemblies connect with front ends of the first and second side plates, the two latching assemblies are spaced apart from each other by a gap, and the first side plate, the second side plate and the two latching assemblies cooperate to define a receiving space receiving the electrical component.

11. The electronic device of claim 10, wherein the electrical component comprises a first side panel and a second side panel at opposite lateral sides, and a third side panel interconnecting the first and second side panels, the first and second side plates of the fixing frame correspond to the first and second side panels of the electrical component, respectively, and the two latching assemblies correspond to and face the third side panel of the electrical component.

12. The electronic device of claim 11, wherein the electrical component is substantially cuboid.

13. The electronic device of claim 11, wherein each of the first and second side plates defines at least one screw hole, and the electrical component is fixed to the first and second side plates by screws.

14. The electronic device of claim 11, wherein each of the first and second side plates defines a connecting hole, and a pair of elastic members extends from rear sides of the first and second side plates that bound rear ends of the connecting holes and bend inwards into the receiving space such that distal ends of the elastic members elastically resist the electrical component and help clasp the electrical component in the fixing frame.

15. The electronic device of claim 11, wherein the mounting frame further comprises a bottom plate and two opposite sidewalls perpendicular extending from the bottom plate, the bottom plate and the two opposite sidewalls cooperatively define an accommodating space receiving the fixing frame and the electrical component, the at least one second latching portion comprises two latching portions, each of the two opposite sidewalls comprises one of the second latching portions, and the first latching portions of the latching assemblies cooperate with the second latching portions of the sidewalls to lock the fixing frame to the mounting frame.

16. The electronic device of claim 9, wherein the at least one first latching portion is a protrusion, and the at least one second latching portion comprises a latching groove.

17. The electronic device of claim 10, wherein the main body of each latching assembly defines a limiting slot, and each latching assembly further comprises a limiting arm which connects to the front end of a corresponding one of the first and second side plates, the limiting arm extends from the front end of the corresponding one of the first and second side plates in a direction parallel to the main body, then bends backwards through the limiting slot, and then bends outwards towards the corresponding one of the first and second side plates such that a hook is defined at a free end of the limiting arm, the hook is restricted in the limiting slot, the hook is adjacent to a side edge of the main body which bounds the limiting slot and which is nearest to the connecting arm, and there is a space between the side edge and the hook.

18. The electronic device of claim 17, wherein the at least one connecting arm of each latching assembly is two connecting arms, the two connecting arms are spaced apart from each other, and the limiting arm of the latching assembly is between the two connecting arms.

19. A frame assembly, comprising:
a mounting frame comprising two opposite second latching portions;
a fixing frame detachably mounted substantially inside the mounting frame, the fixing frame configured for receiving an electrical component therein and comprising:
a first side plate;
a second side plate opposite to the first side plate; and
two latching assemblies connecting with front ends of the first and second side plates, the two latching assemblies being spaced apart from each other by a gap, and each latching assembly comprising a connecting arm, a main body, and a handle, the connecting arm comprising:
a first section extending from a front end of a corresponding one of the first and second side plates a predetermined distance and being coplanar with the corresponding one of the first and second side plates; and
a second section bent backwards from the first section and overlapping the first section, the main body interconnecting the second section of the connecting arm and the handle, the second section of the connecting arm comprising a first latching portion;
wherein the first latching portions of the first and second side plates cooperate with the second latching portions to lock the fixing frame to the mounting frame; and
wherein when the handles of the two latching assemblies are drawn toward each other to reduce the distance between the handles, the main body of each latching assembly moves in unison with the corresponding handle and pulls the second section of the connecting arm of the latching assembly away from the corresponding one of the first and second side plates, with the second section inclining relative to the corresponding one of the first and second side plates, and the latching portions of the latching assemblies move in unison with the second sections of the connecting arms of the latching assemblies and disengage from the second latching portions of the mounting frame.

\* \* \* \* \*